Patented June 7, 1949

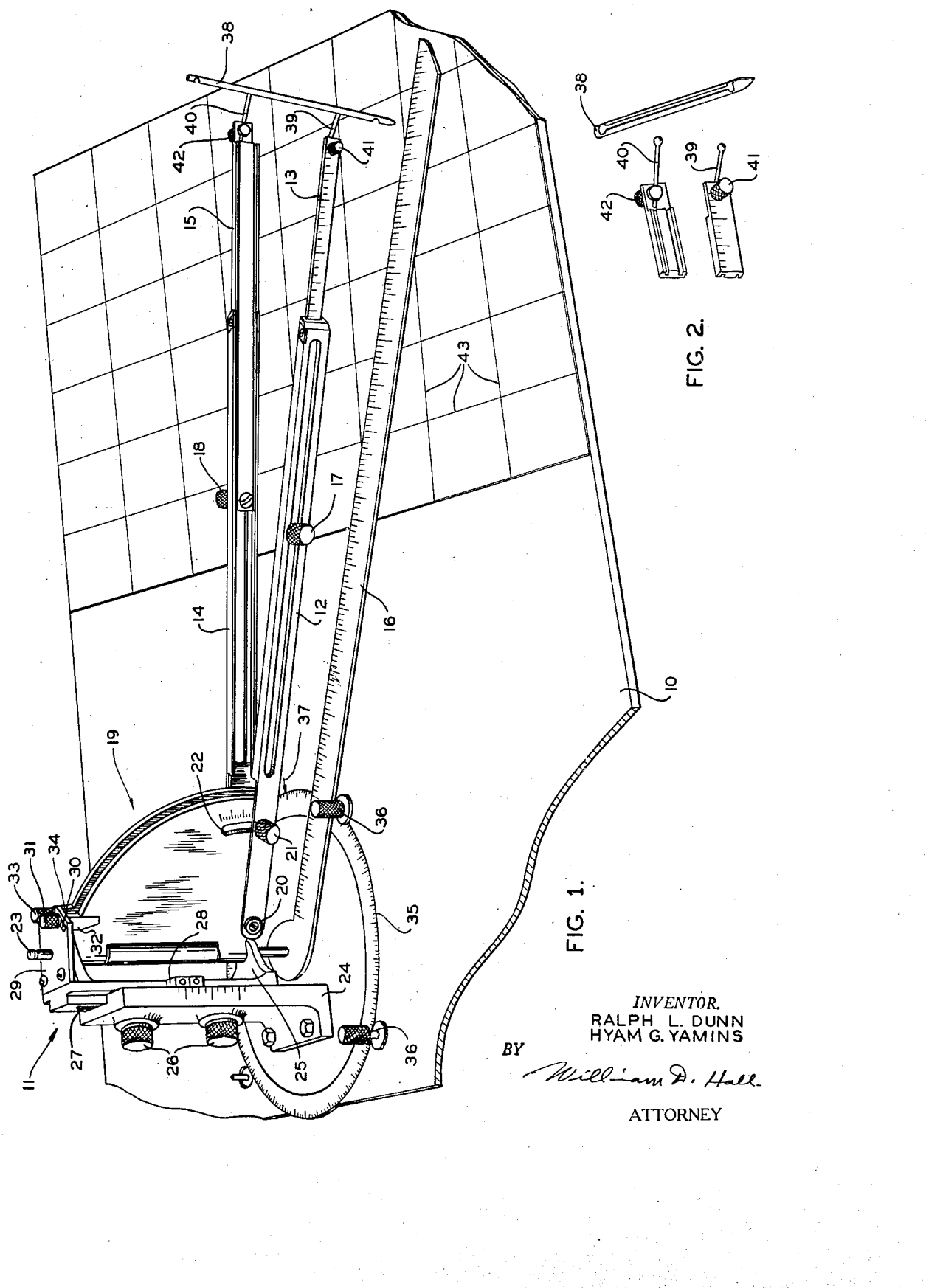

2,472,138

UNITED STATES PATENT OFFICE 2,472,138

PLOTTER COMPUTER FOR DETERMINING SHELLFIRE POSITION

Hyam G. Yamins, Asbury Park, and Ralph L. Dunn, West Belmar, N. J., assignors to the United States of America as represented by the Secretary of War Application May 30, 1945, Serial No. 596,714

9 Claims. (Cl. 33—76)

(Granted under the act of March 3, 1883, as amended April 30, 1928; 370 O. G. 757)

The invention described herein may be manufactured and used by or for the Government for governmental purposes, without the payment to us of any royalty thereon.

The present invention relates to plotter-computer devices adapted to calculate the spatial positions of a plurality of points disposed on the trajectory of a projectile and to extrapolate said points in order to determine the origin or firing point of said trajectory. The invention is particularly useful in conjunction with a radar system furnishing data as to the respective positions of said points.

In the copending application of John H. De Witt, Jr., entitled, "Measuring system," filed May 30, 1945, Serial Number 596,712, there is disclosed a radar system for locating the site of a gun emplacement by fixing the positions, with respect to a radar observation post, of two points on the trajectory of a shell fired from said emplacement, the first of said points being at the intersection of the shell trajectory and the open line of sight closest to the earth's surface and, the second point being a few degrees thereabove in elevation. To this end, there are projected from the observation post two narrow pencil beams of pulsed wave energy having a fixed angular spacing in the vertical plane in relation to each other. These two beams are concurrently made to scan in azimuth a predetermined sector encompassing the emplacement. As a shell fired from the emplacement pierces the lower beam, it produces a trace on a visual indicator and at a slightly later time the same shell piercing the upper beam provides a second trace on said indicator. The indicator is of the type presenting both azimuth and range, and therefore gives the azimuth and range of the shell at the instant it passes through each beam. Since the antenna beams are in fixed angular relation to one another, the relative location of the two echo traces on the indicator furnishes data from which the shell firing position can be mathematically computed.

It is the object of the present invention to simplify the determination of the shell firing position by providing a mechanical plotter-computer which will be in effect a small scale, three-dimensional, physical representation of the indicator display described hereinabove, and having additional provisions for the extrapolation of the two target points back to the point of origin.

It is another object of this invention to provide a plotter-computer of the above type wherein the geographic location of the emplacement is made available in terms of either polar or grid coordinates.

Yet another object of this invention is to provide a plotter-computer of the above type having a high order of accuracy wherein a correction is effected for the difference in sea level elevation between the emplacement and the observation post.

Broadly stated, to fulfill the objects of this invention there is provided a plotting board having mounted thereon two arms with range scales representing the upper and lower beams projected from the observation post, said arms being oriented above the plotting board at the same angles of elevation as the corresponding beams. A point on each arm is determined by the radar range data; likewise, the space positions are determined by the azimuth data. Thereupon, a pointer which may be either straight or parabolic, is projected through the two space points (already located in azimuth, elevation and range) down to the plotting board, thereby fixing the approximate location of the firing site. By placing a contour map of appropriate scale on the plotting surface paper, corrections for the difference in sea level elevation between the observation post and the firing site can be made and the precise location of the latter determined in grid or polar coordinates, as desired.

For a better understanding of this invention, as well as other objects and features thereof, reference is had to the following detailed description to be read in connection with the accompanying drawings, wherein like components are designated by like numerals.

In the drawings:

Figure 1 is a perspective view of a preferred embodiment in accordance with the invention, of a plotter-computer device for determining the geographic position of a gun emplacement, and, Figure 2 illustrates more clearly details of Figure 1.

Referring now to Fig. 1, a perspective view is shown of a plotter-computer consisting or a rectangular plotting board 10 having a computer mechanism 11 centrally disposed thereon near one edge thereof. The computer 11 includes an adjustable arm 12, having a range scale 13 slidably extending therefrom, an identical arm 14, also having a range scale 15 slidably extending therefrom, and a ruler 16. Range scales 13 and 15 ride in respective channels erected by perpendicular flanges on the sides of arms 12 and 14. Each of arms 12 and 14 is provided with a longitudinal slot whose width accommodates the diameter of range scale set screws 17 and 18, and whose length is sufficient to permit the full extension of the range scales.

Arms 12 and 14 are each supported at two points on respective quadrant plates of a hinge 19 by means of a pivot screw 20 and a set screw 21 fitted into an arcuate slot 22 cut into each hinge plate and having indicia inscribed along the length thereof. The angular position of arms 12 and 14 are each adjustable in elevation within the limits defined by slot 22. The pin 23 of hinge 19 is mounted in a vertical position, being affixed at one end to plotting board 10. Ruler 16 lies level with plotting board 10 and is pivoted at one end by hinge pin 23, said end being generally disc-shaped.

Means are provided for raising or lowering the quadrant plates of hinge 19, and apparatus connected thereto, along the axis of pin 23, said means consisting of a bracket 24 bolted to plotting board 10 and having a longitudinal groove serving as a track for the indented base of a yoke 25. The cylindrical portion of each of the quadrant plates of hinge 19 is held by its ends between the sides of yoke 25 with the pin 23 being received within suitable bores therein. The desired position of yoke 25 is maintained by a pair of set screws 26 fitted into a longitudinal slot 27 formed in the base of the yoke. Indicia are inscribed along one side of bracket 24, and a pointer line is marked on a block 28 attached laterally to the base of yoke 25.

A plate 29 is mounted on the upper side of yoke 25 and is provided with an arcuate slot 30 concentric with the pin 23. Riding within slot 30 is a set screw 31, threadably received in a stock 32 vertically mounted on one of the quadrant plates of hinge 19, and a set screw 33 similarly connected to a stock 34 on the other hinge plate. Thus is seen that arms 12 and 14 may each be swung in azimuth within the limits defined by slot 30.

Coaxial with hinge pin 23 is an annular 360° scale 35 received within a circular track cut in plotting board 10. Scale 35 is maintained in any desired position by four set screws 36 (only two being shown) with respect to an arrow 37 inscribed on plotting board 10 and marking the zero or reference position of the computer 11. To facilitate the manual rotation of scale 35, the track is cut so that the scale slightly protrudes from one edge of the plotting board 10.

A pointer 38 is coupled to both range scales 13 and 15. This is demonstrated more clearly in Fig. 2, showing separately the pointer 38 and coupling pins 39 and 40 extending from respective terminal screws 41 and 42 on scales 13 and 15. The body of pointer 38 is hollow and has a longitudinal slot communicating with the hollow interior to define a socket for the ball heads of pins 39 and 40, with the ends of the slot being enlarged to permit the insertion of the pin heads. The spatial position of pins 39 and 40 will, of course, control the point on the plotting board 10 that the tip of pointer 38 strikes.

In operating the plotter-computer, the procedure is first to align the azimuth scale 35 with the arrow 37 so that it corresponds to the reference or zero position of the azimuth sector scanned by the radar system. Since the sector scanned may be shifted, an adjustment of the scale 35 is required with every change of sector. Thereupon the hinge 19 is lowered so that arms 12 and 14 are level with plotting board 10, and the arms are swung along the azimuth scale 35 to positions corresponding in azimuth with the echo trace received from the two target hits. When the azimuth positions of arms 12 and 14 are set, the arms are raised so that they each occupy the same angular positions in elevation as the corresponding beams. The indicia along slot 22 of each hinge plate are calibrated in degrees to this end.

After the elevational positions of arms 12 and 14 are set, the extensions of range scales 13 and 15 are adjusted in accordance with the range data obtained from the target echoes. It will now be seen that pointer 38 is projected through two points in space lying in the path of the shell trajectory down to plotting board 10 and consequently will provide the approximate location of the firing site.

Knowing the approximate location of the emplacement, correction can now be effected for the difference in sea level elevation between the emplacement and the observation post. This correction is readily accomplished by placing a contour map of appropriate scale on plotting board 10, determining from the map the difference in elevation between the observation post and the approximate location of the emplacement, and then adjusting the height of yoke 25, and thereby all elements connected therewith, along the indicia on bracket 24 in accordance with this difference. The pointer 38 is now directed with a high order of accuracy to the exact site of the emplacement.

The information furnished by the plotter-computer may be read in terms of either grid or polar coordinates, the former type of reading being directly obtainable from a suitable chart having grid lines 43 overlayed on plotting board 10. If a polar coordinate reading is desired, this may be obtained by aligning ruler 16, which is calibrated in terms of horizontal range, with the tip of pointer 38. The azimuth is then read at the intersection of ruler 16 and scale 35.

As a further refinement, the pointer 38 may be bent to conform with the slight curvature of the trajectory in the lower portion of the rising excursion thereof. However, for most practical purposes a straight line pointer is sufficiently accurate as long as the beams are projected in close proximity to the earth's surface.

While there has been described what is at present considered a preferred embodiment of the invention, it will be obvious to those skilled in the art that various changes and modifications may be made therein without departing from the invention, and it is, therefore, aimed in the appended claims, to cover all such changes and modifications as fall within the true spirit and scope of the invention.

What is claimed is:

1. A plotter-computer, for determining the origin point of a trajectory where the spatial positions of a plurality of points thereon with respect to an observation post are known, comprising a plotting board having a point thereon representing the observation post, means for physically representing in a reduced scale above said plotting board the spatial positions of the plurality of trajectory points with respect to said post point, and a pointer for extrapolating said points to said plotting board to fix the origin point of said trajectory.

2. A plotter-computer, for determining the origin point of a trajectory where the spatial positions of a plurality of points thereon with respect to an observation post are known, comprising a plotting board having a point thereon representing the observation post, means for physically representing in a reduced scale above said plotting board the spatial positions of the plurality of trajectory points with respect to said post point, a pointer for extrapolating said points to the plotting board to fix the origin point of said trajectory, a 360° azimuth scale on said plotting board concentric with said post point, and a ruler calibrated in terms of horizontal range pivoted at one end at said post point and level with said plotting board whereby when aligned with said origin point a polar coordinate reading thereof is provided.

3. A plotter-computer, for determining the origin point of a trajectory where the spatial positions of a plurality of points thereon with respect to an observation post are known, comprising a plotting board, a like plurality of arms radiating from a pivot on said board, means for adjusting the respective lengths of said arms in proportion to the known range between the trajectory points and the observation posts, means for adjusting the respective angular elevation positions of said arms to correspond with lines connecting the trajectory points and the observation post, means for adjusting the respective azimuth positions of said arms to correspond with the azimuth of said trajectory points with respect to the observation post, and means for extrapolating the terminals of said arms to the plotting board to fix the origin point of the trajectory.

4. A plotter-computer, for determining the origin point of a trajectory where the spatial positions of a plurality of points thereon with respect to an observation post are known, comprising a plotting board, a like plurality of arms radiating from a pivot on said board, means for adjusting the respective lengths of said arms in proportion to the known range between the trajectory points and the observation posts, means for adjusting the respective angular elevation positions of said arms to correspond with lines connecting the trajectory points and the observation post, means for adjusting the respective azimuth positions of said arms to correspond with the azimuth of said trajectory points with respect to the observation post, means for elevating along a vertical line said pivot above said board, and means for extrapolating the terminals of said arms to the plotting board to fix the origin point of the trajectory.

5. A plotter-computer, for determining the origin point of a trajectory where the spatial positions of a plurality of points thereon with respect to an observation post are known, comprising a plotting board, a like plurality of arms radiating from a pivot on said board, means for adjusting the respective lengths of said arms in proportion to the known range between the trajectory points and the observation post, means for adjusting the respective azimuth positions of said arms to correspond with the azimuth of said trajectory points with respect to the observation post, means for elevating along a vertical line said pivot above said board, means for extrapolating the terminals of said arms to the plotting board to fix the origin point of the trajectory, a 360° azimuth scale concentric with said pivot, a ruler calibrated in terms of horizontal range level with said board and pivoted at one end by said pivot whereby when aligned with said origin point a polar coordinate reading thereof is provided.

6. A plotter-computer, for determining the origin point of a trajectory where the spatial positions of a plurality of points thereon with respect to an observation post are known, comprising a plotting board having a point thereon representing the observation post, means for physically representing to a reduced scale above said plotting board the spatial positions of the plurality of trajectory points with respect to said post point, and means for extrapolating said points to said plotting board to fix the origin point of said trajectory.

7. A plotter-computer, for determining the origin point of a trajectory where the spatial positions of a plurality of points thereon with respect to an observation post are known, comprising a plotting board having a point thereon representing the observation post, means for physically representing to a reduced scale above said plotting board the spatial positions of the plurality of trajectory points with respect to said post point, means for extrapolating said points to the plotting board to fix the origin point of said trajectory, an azimuth scale on said plotting board relative to said post point, and means to measure horizontal range relative to said post point whereby a polar coordinate reading of the origin point is provided.

8. A plotter-computer, for determining the origin point of a trajectory where the spatial positions of a plurality of points thereon with respect to an observation post are known, comprising a plotting board having a point thereon representing the observation post, means for physically representing to a reduced scale above said plotting board the spatial positions of the plurality of trajectory points with respect to said post point, means for elevating along a vertical line said point above said board, and means for extrapolating said trajectory to the plotting board to fix the origin point of the trajectory.

9. A plotter-computer, for determining the origin point of a trajectory where the spatial positions of a plurality of points thereon with respect to an observation post are known, comprising a plotting board having a point thereon representing the observation post, means for physically representing to a reduced scale above said plotting board the spatial positions of the plurality of trajectory points with respect to said post point, means for extrapolating the trajectory points to the plotting board to fix the origin point of the trajectory, and an azimuth scale on said plotting board relative to said post point, and means to measure horizontal range relative to said post point whereby a polar coordinate reading of the origin point is provided.

HYAM G. YAMINS.
RALPH L. DUNN.

REFERENCES CITED

The following references are of record in the file of this patent:

FOREIGN PATENTS

| Number | Country | Date |
| --- | --- | --- |
| 16,316 | Great Britain | Nov. 19, 1915 |
| 117,747 | Great Britain | Aug. 1, 1918 |